United States Patent [19]

Taniguchi et al.

[11] 3,946,204

[45] Mar. 23, 1976

[54] CARD READER PROTECTING DEVICE

[75] Inventors: Tadasu Taniguchi, Tokyo; Iwao Hosaka; Shigeru Yoshida, both of Chichibu, all of Japan

[73] Assignees: Canon Kabushiki Kaisha; Canon Denshi Kabushiki Kaisha, both of Tokyo, Japan

[22] Filed: July 10, 1974

[21] Appl. No.: 487,369

[30] Foreign Application Priority Data

July 13, 1973 Japan.............................. 48-79590
July 13, 1973 Japan.............................. 48-79589

[52] U.S. Cl....... 235/61.11 R; 235/61.7 B; 271/238; 340/149 A; 360/71; 235/61.12 R
[51] Int. Cl.². G06K 7/06; B65H 9/06; G11B 15/18; G06K 19/08
[58] Field of Search 235/61.11 R, 61.11 A, 61.11 B, 235/61.11 C, 61.11 D, 61.11 E, 61.12 R, 61.12 N, 61.12 M, 61.12 C, 61.1, 61.7 B; 340/149 A; 200/46; 194/4 F, 4 G, DIG. 6; 271/238; 360/71

[56] References Cited

UNITED STATES PATENTS

| | | | |
|---|---|---|---|
| 3,403,380 | 9/1968 | Welch | 340/149 A |
| 3,457,391 | 7/1969 | Yamamoto | 235/61.6 R |
| 3,629,556 | 12/1971 | Orzechowski | 235/61.11 B |
| 3,644,711 | 2/1972 | Haller | 235/61.1 |
| 3,821,519 | 6/1974 | Pietenpol | 235/61.11 D |
| 3,850,426 | 11/1974 | Blair | 271/238 |

*Primary Examiner*—Daryl W. Cook
*Assistant Examiner*—Robert M. Kilgore
*Attorney, Agent, or Firm*—Fitzpatrick, Cella, Harper & Scinto

[57] ABSTRACT

A card reader protecting device is provided which prevents any wrong card or foreign substance from being pushed thereinto by providing a material to be detected such as metal foil for indicating the authenticity of any normal card, and detecting adaptive signals produced by such a material, said device comprising a detection circuit for detecting said material, and a control circuit for controlling feed of said normal card to the card reader.

16 Claims, 6 Drawing Figures

CARD READER PROTECTING DEVICE

BACKGROUND OF THE INVENTION

1. Field of the Invention

This invention relates to a card reader protecting device, and more particularly to a protecting device for preventing any card other than a normal card from being inserted into the card reader provided in a cash dispenser and the like.

2. Description of the Prior Art

Magnetic lock, which permits only a right person identified by a magnetic card to perform a desired operation thereof, is now used for locking the door of a safe, a laboratory or a cash dispenser for automatic payment of cash, since the magnetic lock has such advantages that it is excellent in security and secrecy, and in addition, the magnetic card used in cooperation with said magnetic lock is suitable for portability and usability of card in combination, for example with ID card and the like. In other words, almost numberless keys may be produced by use of key codes variable only little by little. Furthermore, as electrical signals are produced when card codes are read, it is possible to record cash payment such as amount of payment, date of payment etc. or to obtain recording as to door operation such as a frequency of opening and closing door, time at the operation of the door and operators or users identification by means of reading personal codes. Still furthermore, key codes may be hardly copied by a third person due to unreadability thereof in magnetic cards under normal conditions. Such a device as to permit the reading of any necessary information out of a magnetic card is called generally a card reader. In this invention the word "card" means a recording medium in a broader sense in view of possible substitution of the card by any other same type of recording medium.

Now such a card reader must be protected against possible use intentional or accidental of any wrong card. Here the wrong card means not a card with a wrong key code number (which may be found in code reading) but any card specified for other devices or a name card. For example, if a card short in length is used, it cannot be taken out as it remains beyond feed rollers. (Generally a card carried through such feed rollers may be fed back by reverse running of a motor controlled by a microswitch for reverse motor operation provided in inner position and actuated when it is struck before the card leaves the feed rollers.) If a card much thinner than a normal card is used, jamming may occur, and if a card too wide is used, it may fail to move on in the entrance. In some cases the function may get out of order as a result of clogging a slot with butt, paper trash, chewing gum or other foreign material by wanton mischief. Thus, whenever any wrong card of no standards or any foreign substance is found by means of a detector of card authenticity, before the card slot that is, before a card reader section including card feed rollers, reading head etc., their farther insertion must be prevented.

SUMMARY OF THE INVENTION

An object of this invention is to provide a protecting device having operating means for preventing any card other than a normal card or any foreign substance from being inserted in the section of a card reader, considering such trouble as described above.

Another object of this invention is to provide a protecting device for sending alarm, whenever any wrong card or foreign substance has been inserted or when being inserted. A still another object of this invention is to provide a protecting device for permitting reduction of an error rate in code reading by minimizing an area occupied by a material to be detected, contained or bonded to a magnetic card and avoiding reduction of a recording area for a key code. A still further object of this invention is to provide a protecting device having time limit closing means for preventing any wrong card or foreign substance from being pushed into a slot, when unlocking is made by use of a normal card, and said card is left there. All other objects of this invention will be clear from the following embodiments to be described with reference to the accompanying drawings.

DESCRIPTION OF THE PREFERRED EMBODIMENTS

Figure 1:
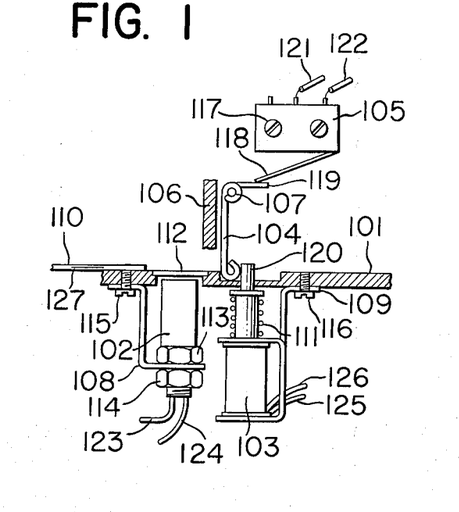
FIG. 1 shows a protecting device for detecting the authenticity of any magnetic card when it is being inserted and opening a shutter by operating means for permitting insertion of said magnetic card only when it is a card with a material for normal detection, said magnetic card having such material as metal foil put therein.
Figure 6:
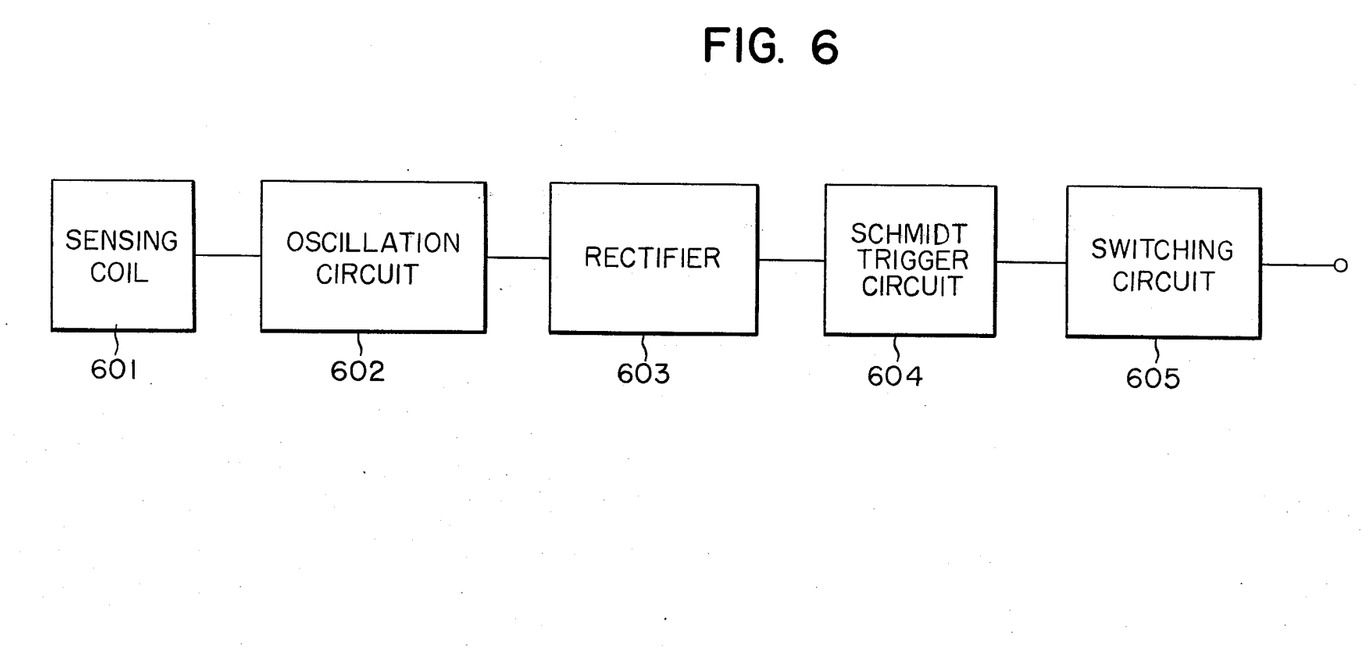
FIG. 6 is a block diagram of one embodiment of a proximity switch used as detecting means.

In FIG. 1, which shows a first embodiment of this invention 101 represents a card reader body for reading a card code, 102 a proximity switch as a detector of the authenticity of the card for detecting a material such as metal foil contained therein. The proximity switch 102 is so arranged as shown in FIG. 6. In FIG. 6, 601 represents a sensing coil which inductance may vary as a metal foil approaches it, 602 an oscillation circuit, which is normally in oscillation, with said sensing coil 601 forming part of said oscillation circuit 602, 603 a rectifier for rectifying output from the oscillation circuit, 604 a Schmidt trigger circuit for producing the output of shaped square wave trigger signals by operating the Schmidt trigger circuit 604 when output voltage is decreased and goes down below a certain level at the time of suspension of oscillations in said oscillation circuit, 605 a switching circuit for operating a relay RL1 to be described later when it receives said trigger signals. 103 operating means to be described hereunder, which is a solenoid plunger to control operation of a shutter so as to close the shutter when not energized and open it when energized, and 104 the shutter to be locked normally by means of a head 120 on said plunger 103 and disabled to open, and to be released and opened when said plunger is activated with output from said proximity switch by use of any normal magnetic card. 105 represents a microswitch as open-state holding means, which is turned on as said shutter 104 is pushed up to open so as to keep an electrical circuit closed during the opening of the shutter and thus hold said shutter open, 106 a protecting cover for protecting the shutter from dust, forced insertion of any foreign substance, or damage by strike, 107 a hinge for supporting said shutter rotatably, 108 a holder for holding said proximity switch as a detector, 109 a holder for holding said plunger 103, 110 a card which is usually in the form of a plastic plate having magnetic film for recording coated fully on the back side thereof or magnetic stripes bonded thereon, 111 a compression coil spring for pushing up a head 120 on said plunger 103 so as to lock the shutter 104 again by help of its compressive force released when the plunger 103 is deenergized, 112 a cover for covering the proximity switch 102 and other part as a detector, 113 and 114 nuts for fixing the proximity switch 102 on said holder 108, 115 a screw for fastening said holder 108 of the proximity switch 102 on said card reader body 101, 116 a screw for fastening said plunger holder on said card reader body 101, 117 screws for fixing the microswitch, 118 an actuator of the microswitch 105 for turning on when it is pressed with the shuter opened, 119 a shutter arm provided on the shutter 104 for pushing said actuator 118, 120 the head on the plunger for locking the shutter 104, 121, 122, 123, 124, 125 and 126 lead wires for connecting the microswitch 105 and the plunger 103 to the electrical circuit, 127 a material such as metal foil to be detected contained in said magnetic card 110 or bonded thereon, said metal foil 127 being provided properly in relation to the proximity switch 102 and the shutter 104 in terms of position, size, and arrangement in the card.

Figure 2:
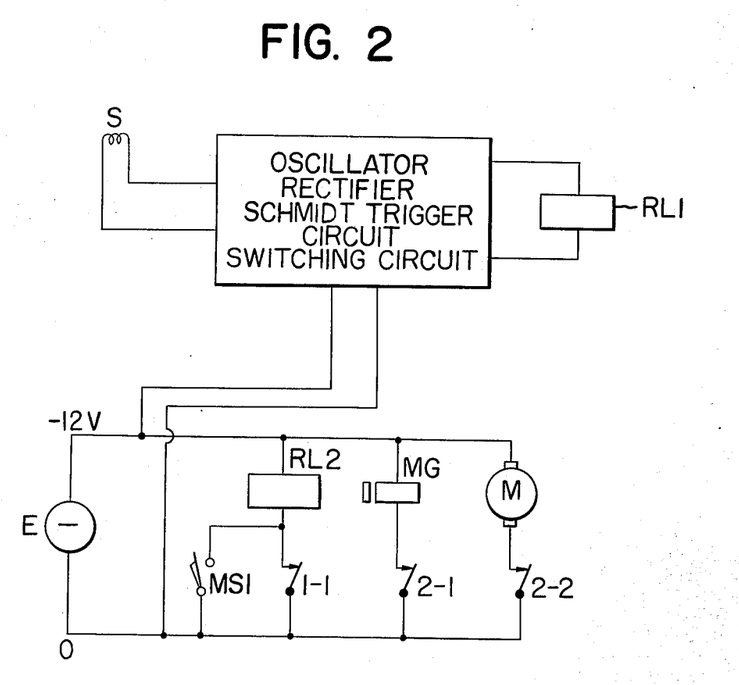
FIG. 2 shows a circuit arrangement for realizing related functions of individual mechanisms of FIG. 1.

In FIG. 2, S represents a detector for detecting the authenticity of any magnetic card, which is equivalent to the sensing coil 601 in the proximity switch 102 of FIG. 1 in this embodiment, RL1 and RL2 relays, MG a solenoid plunger equivalent to 103 in FIG. 1, M a motor for driving card feed rollers, MS1 a microswitch equivalent to 105 in FIG. 1, and E a power source. 2-1 and 2-2 represent contacts controlled by the relay RL2. Between the detector S and the relay RL1 are inserted oscillator, Schmidt trigger circuit, and switching circuit, where oscillations may continue in the oscillator until any magnetic card is inserted.

With such arrangement as described above, the magnetic card 110 is pushed by hand into a slot (under the protecting cover 106), passing over the proximity switch 102. When the metal foil 127 reaches a point over the proximity switch 102, it is detected and a signal is fed therefrom through the lead wires 123 and 124. With this signal the oscillator stops osillations, and the switching circuit operates so as to actuate the relay RL1. Thus the contact 1-1 is closed, and the contacts 2-1 and 2-2 are closed to energize the plunger 103 (MG) and start operation of the motor M for driving the card feed rollers. Energizing the plunger 103 (MG) results in unlocking the shutter 104, in FIG. 1, by attracting the head 120 on the plunger 103 (MG) downward, which serves as a stopper for keeping the shutter 104 closed normally. Under this condition the magnetic card 110 may go farther into the body (to the right with respect to the protecting cover 106 in FIG. 1), pushing the shutter 104 upward. At this time the shutter arm 119 may swing around the hinge 107 within a period of operation of the proximity switch 102 controlled with the metal foil 127 in the magnetic card 110, which length is long enough for the period, and strike against the actuator 118 on the microswitch 105 (MS1) so as to turn it on. When the metal foil 127 in the magnetic card 110 leaves the proximity switch 102 (S) and is coming into a non-detecting area, the relay RL1 is put out operation, and the contact 1-1 is opened. On the other hand, the microswitch 105 (MS1) is kept closed as long as the shutter 104 is pushed upward with the magnetic card 110 thus inserted, and the relay RL2 remains to work, and consequently, the plunger 103 (MG) and the motor M continue to operate. Thus the magnetic card 110 is then taken into feed rollers (not shown here) and is fed automatically to the right. The card code is read through a code reader (not shown), and its authenticity is proved. In case the code is acceptable, operation as required may be achieved such as cash supply from a cash dispenser or opening the door of a safe and the like.

The magnetic card 110 may pass farther to the right in FIG. 1, or may be ejected to the left in FIG. 1 by reversing operation of the motor M with another actuator on a separate microswitch (not shown), which may be provided in inner position and controlled by the striking of the leading edge of the magnetic card 110 before the rear edge is completely inserted into the slot. Such two cases will be called case 1 and case 2.

In case 1, when the magnetic card 110 has moved on farther than a certain point, the shutter 104 is released from the magnetic card 110 on which it rides and by which it is obstructed on the slant, and is returned to the original position by pressure of the actuator 118. In this case the resilient force of the actuator 118 may be imparted as it is. A separate spring may also be employed for this purpose. When the shutter 104 is returned to the original position, the microswitch 105 (MS1) is turned off. The switch 1-1 is already turned off, and thus the relay RL2 becomes inoperative to open the contacts 2-1 and 2-2. As a result the plunger 103 (MG) is deenergized, and the head 120 on the plunger 103 goes up by help of the resilient force of the compression coil spring 111 so as to lock the shutter 104 again. At this time the motor M stops running. If the magnetic card 110 cannot be fed completely without a little further operation of the card feed rollers due to timing for operation of the relay RL2, a delay circuit may be added to the contact 2-2 alone.

In case 2, after reversing the feed of the magnetic card 110, the leading edge moves on the the left, and the card leaves the shutter 104 at a certain point. Generally in this case the magnetic card 110 must be ejected from the feed rollers, already leaving them. Thus, releasing the magnetic card 110 from the shutter 104 is done by pulling out by hand. The shutter 104 is returning, following the leading edge of the magnetic card 110, and before the microswitch 105 (MS1) is turned off, the metal foil 127 in the magnetic card 110 may pass again over the proximity switch 102 (S) so as to turn on the relay RL1 and close the contact 1-1. Then, even when the shutter has been returned and the microswitch (MS1) is opened, the plunger 103 (MG) and the motor M may continue to operate as long as the contact 1-1 is kept closed. By pulling out the magnetic card 110 farther to the left, the metal foil 127 in the card 110 cannot remain any more over the proximity switch 102 (S). Thus, the switch 102 becomes inoperative to stop operation of the relay RL1, and the contact 1-1 is opened. The relay RL2 becomes inoperative, too so as to open the contacts 2-1 and 2-2. Consequently the head 120 on the plunger 103 is returned to the original position with the result of locking the shutter 104 again and stopping operation of the motor M. In the event any magnetic card 110 is found not acceptable because of no presence of the metal foil 127, the proximity switch 102 (S) may not operate and consequently the plunger 103 (MG) may not operate either. The shutter 104 is then kept in its locked state, and cannot be pushed upward by means of any foregin matter such as a name card or a pencil other than a normal magnetic card.

Figure 3:
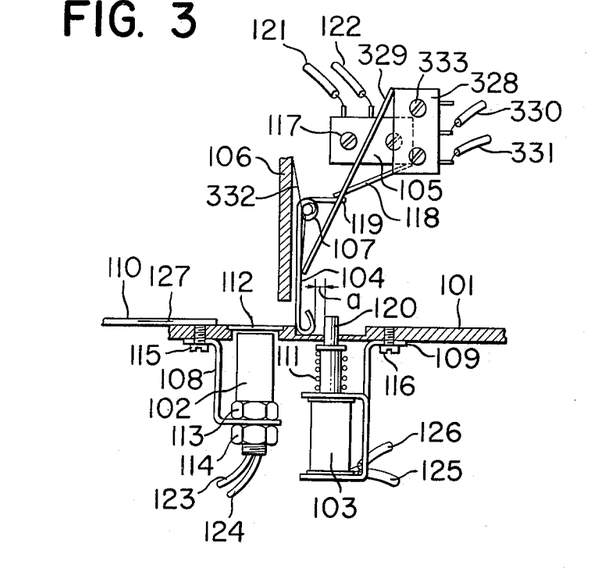
FIG. 3 shows a protecting device including alarming means in addition to the protecting device of FIG. 1.
Figure 4:
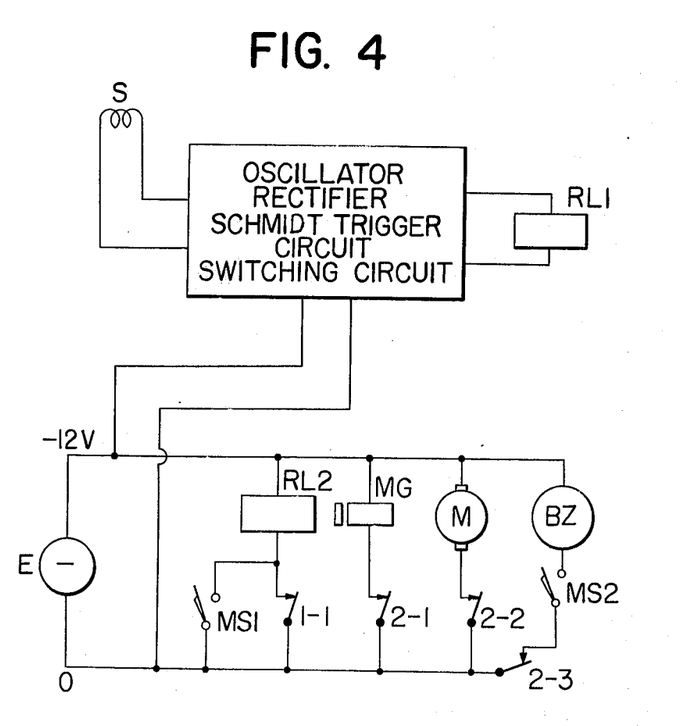
FIG. 4 shows a circuit arrangement of the protecting device of FIG. 3.

FIGS. 3 and 4 show a second embodiment of this invention, in which an alarming buzzer is added to the first embodiment as described above. In FIGS. 3 and 4, like reference numerals represent like parts or components in FIGS. 1 and 2 for clarity of explanation. 328 represents alarming means such as a second microswitch for controlling a buzzer and the like, which is a sort of switching means to be operated whenever anything other than a normal material to be detected is attempted to use, 329 a second actuator on the microswitch for turning on in relation to said shutter 104 when it swings around said hinge 107, 330 and 331 lead wires for connecting said second microswitch 328 to an electrical circuit, 332 a portion coil spring for returning the shutter 104 to the original position, which may not necessarily required by making use of resilient forces of said first and second actuators 118 and 329, but is provided for positive operation of the shutter 104 and 333 screws for fixing the second microswitch on the card reader body. There is a gap between the head 120 on the plunger 103 and the shutter 104 so that when any foreign object is attempted to use, the shutter 104 may be moved a little inward so as to turn on the second microswitch 328 with the actuator 329 in relation to the shutter 104.

In FIG. 4, BZ represents alarming means such as a buzzer for sending alarm whenever any object other than the normal material to be detected is tried to use, which may be substituted by some alarm lamps or used together therewith in parallel or provided with a signal transmitter to a concentrated control system. MS2 represents the second microswitch, and 2-3 a contact controlled by the relay RL2, which is provided additionally in this embodiment. Contacts 1-1, 2-1 and 2-2 are normally opened, while the contact 2-3 is normally closed, which may be brought into their opposite states by the function of related relays.

With such arrangement as described above, the magnetic card 110 is pushed to the slot by hand. When the metal foil 127 is passing over the proximity switch 102 after the leading edge of the magnetic card 110 has passed over, the proximity switch 102 detects the metal foil 127 and transmits a signal through the lead wires 123 and 124. With this signal the oscillator stops ocillations so as to operate the switching circuit and the relay RL1. When the relay RL1 is actuated, the contact 1-1 is closed, and the relay RL2 is operated so as to close the contacts 2-1 and 2-2 and open the contact 2-3. Thus the plunger 103 is energized to start operation of the motor M for driving card feed rollers. Energizing the plunger 103 (MG) results in unlocking the shutter 104, in FIG. 3, by attracting the head 120 on the plunger 103 (MG) downward, which serves as a stopper for keeping the shutter 104 closed normally. Under this condition the magnetic card 110 may move on into the body, pushing the shutter 104 upward. At this time the contact 2-3 is opened by the relay 2, and the buzzer BZ may not send alarm even when the second microswitch 28 is turned on with the actuator 329 in mechanical relation. The arm 119 of the shutter 104 is turned around the hinge 107 within a period of operation of the proximity switch 102 controlled by the metal foil 127 in the magnetic card 110, which is long enough for the period so as to strike against the actuator 118 on the microswitch 105 (MS1) and turn on. When the metal foil 127 in the magnetic card 110 moves far from over the proximity switch 102 (S) and enters a nondetecting area, the relay RL1 becomes inoperative so as to open the contact 1-1. However, as long as the shutter 104 is kept pushed upward with the magnetic card 110, the first microswitch 105 (MS1) is closed, and consequently the relay RL2 remains operative and the plunger 103 (MG) and the motor M continue to operate. Thus, the magnetic card 110 is taken into feed rollers (not shown) and moved automatically to the right. Then, the card code is read through a card reader (not shown), and examined for acceptance. When it is found normal, the device may work as desired, for example, a cash dispenser may supply cash as wanted or the door of a safe may be opened. The magnetic card 110 may move through to the right in FIG. 3 or may be ejected to the left in FIG. 3 by reversing operation of the motor M with another actuator (not shown) on a separate microswitch to be mounted in inner position, said actuator being controlled by striking with the leading edge of the magnetic card 110 before the rear edge is completely inserted. Such two cases will be called case 1 and case 2.

In case 1, when the magnetic card 110 has moved on farther than a certain point, the shutter 104 is released from the magnetic card 110 on which it rides and by which it is obstructed on the slant, and is returned to the original position by pressure of the actuator 118. With the shutter 104 returned to the original position the first microswitch 105 (MS1) is turned off. As the contact 1-1 is already opened, the relay RL2 becomes inoperative with the result of opening the contacts 2-1 and 2-2 and closing the contact 2-3. Thus the plunger 103 (MG) is deenergized, and the head 120 on the plunger 103 (MG) goes up by help of the resilient force of the compression coil spring 111 so as to lock the shutter 104 again. In this case a delay circuit may be added to the contact 2-2 alone if the magnetic card 110 cannot be fed to the end without operating the card feed rollers a little longer due to timing for operation of the relay RL2.

In case 2, the leading edge of the magnetic card 110 moves to the left, and may leave the shutter 104 at a certain point. Generally in this case the magnetic card 110 must be ejected from the feed rollers, already leaving them. Thus, releasing the magnetic card 110 from the shutter 104 is done by pulling out by hand. The shutter 104 is returning, following the leading edge of the magnetic card 110, and before the microswitch 105 (MS1) is turned off, the metal foil 127 in the magnetic card 110 may pass again over the proximity switch 102 (S) so as to turn on the relay RL1 and close the contact 1-1. Then, even when the shutter has been returned and the microswitch (MS1) is opened, the plunger 103 (MG) and the motor M may continue to operate as long as the contact 1-1 is kept closed. By pulling out the magnetic card 110 farther to the left, the metal foil 127 in the card 110 cannot remain any more over the proximity switch 102 (S). Thus, the switch 102 becomes inoperative to stop operation of the relay RL1, and the contact 1-1 is opened. The relay RL2 becomes inoperative, too. The contacts 2-1 and 2-2 are then opened, and the contact 2-3 is closed. Consequently the head 120 on the plunger 103 is returned to the original position so as to lock the shutter 104 again, and the motor M stops running.

Heretofore, operation of one embodiment of this invention has been described with a normal magnetic card used. In the event any wrong card of foreign object is attempted to use forcibly, no signal is produced from the proximity switch 102 (S) for operating the relay RL1. Thus the plunger 103 (MG) is kept inoperative, and the head 120 on the plunger 103 remains in its rising position, serving as a stopper for the shutter 104.

On the other hand, when any foreign object is being inserted, the shutter 104 may be pushed therewith to turn on the second microswitch 328 (MS2), and the buzzer BZ may send alarm with the buzzer circuit closed along with the contact 2-3 closed normally. Meanwhile the first microswitch 105 may not be operated with the actuator 118 thereon even though it may swing a little within a gap, (a), and the relay RL2 is left inoperative. Thus the plunger 103 (MG) and the motor M for driving the card feed rollers are not operated with the contacts 2-1 and 2-2 kept open (and the contact 1-1 kept open, too because of no operation of the relay RL1).

Here the buzzer circuit may be more simplified as follows: the shutter and the solenoid plunger are made of some conductor and are connected in series with a power source and a buzzer, so that the buzzer may be operated by contacting the shutter with the head of the plunger when the former is pushed without operation of the plunger.

In the above first and second embodiments the metal foil 127 such as aluminum foil is contained as a material to be detected in the magnetic card 110. It is required that at least part of said metal foil 127 be present within the detecting area of said proximity switch 102 until the microswitch 105 is turned on when the magnetic card 110 moves on to the slot. To this end the metal foil 127 must have a certain given length. However, this may not be often realized due to limitation in the formation of the magnetic card 110 or in the structure of the device. For example, if a piece of metal is contained in the magnetic card 110, that portion alone may become too thick to do magnetic recording or reproduction of any key code. If the metal piece 127 has a good length, it may overlap a region for magnetic recording on the card 110, causing possible errors in reading such a code. It is disadvantageous to make the region for magnetic recording narrower for avoiding this, in terms of recording capacity. To retain such recording capacity unchanged the magnetic card 110 itself should be made larger in size.

Furthermore, if the magnetic card 110 is not inserted into the card reader body intentionally or accidentally with the shutter 104 kept unlocked, or if the magnetic card 110 is left over the proximity switch 102, a wrong card or some foreign object may be pushed into the shutter 104 as it is kept open.

Figure 5:
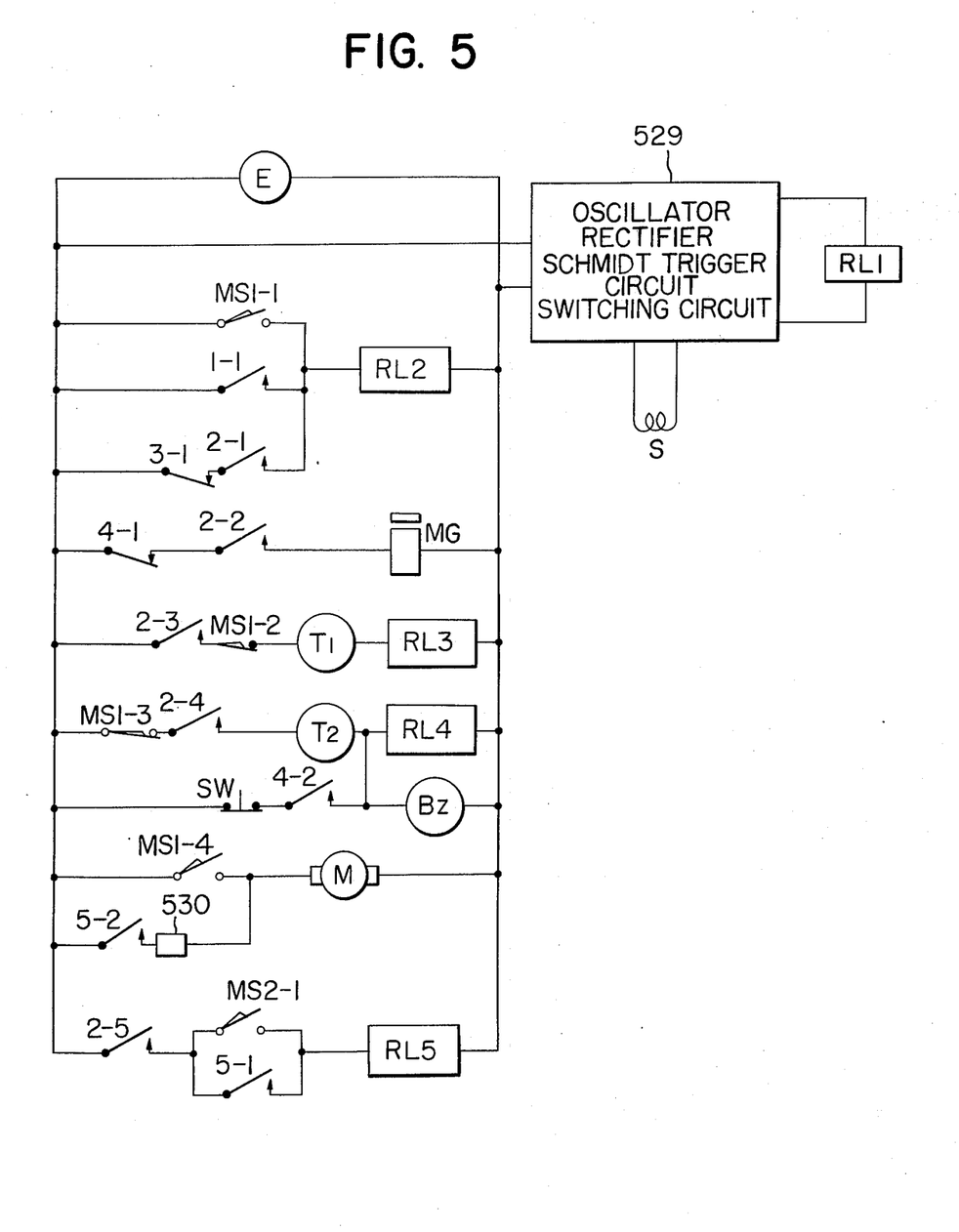
FIG. 5 shows a circuit arrangement in which momentary delay means and time limit closing means are added to the protecting device shown in FIG. 1, the former means being used for keeping said operating means open for a while until open-state holding means to be described subsequently starts operation, and the latter means being used for making said operating means closed by said control means when said open-state holding means fails to operate in a certain given time even after the card is found normal.

FIG. 5 shows a third embodiment, which is improvements in the first embodiment, considering the above disadvantage. They are two new additional functions: one is to avoid reduction of a recording region for a key code and any error in reading such a code through the card reader body, and one is to prevent any wrong card or foreign object from being pushed thereinto by time limit closing means for making operating means closed whenever said means for keeping the opened condition fail to work in a certain period of time or the magnetic card is not inserted into the card reader body even after is has been found normal.

In FIG. 5, represents a detector for checking the authenticity of the magnetic card 110, which is equivalent to sensing coil 601 (FIG. 6) the proximity switch 102 in FIG. 1, and RL1, RL2, RL3, RL4 and RL5 relays. The relay RL1 is operated with output from the detector S. MG represents a solenoid plunger, M a motor for driving card feed rollers, MS1-1 to MS1-4 microswitches for keeping the shutter 104 opened (equivalent to 105 in FIG. 1), MS2 a microswitch for reversing operation of the motor M (not shown in FIG. 1), E a power source, BZ alarming means such as a buzzer and alarm lamps to be provided usually in a concentrated control room, SW a manual switch for stopping operation of said alarming means, which is provided so as to be operated in the concentrated control room here, T1 and T2 timers (delay circuits) to be described later for operating relays RL3 and RL4 in a certain period of time after the closing of the contacts 2-3 and 2-4 of the relay RL2, T2 having the operating time t2 longer than that t1 of the timer T1, for example, about 10 seconds set for T2 and about one second for T1, 529 a proximity switch circuit (102) component including oscillator, rectifier, Schmidt trigger circuit, and switching circuit, 530 a circuit for reversing operation of the motor M. 1-1 represents a normally opened contact of the relay RL1, 2-1, 2-2, 2-3, 2-4 and 2-5 normally opened contacts of the relay RL2, 3-1 a normally closed contact of the relay RL3, 4-1 a normally closed contact of the relay RL4, 4-2 a normally opened contact of the relay RL4, 5-1 and 5-2 normally opened contacts of the relay RL5, MS1-1 and MS1-4 contacts to be closed with the microswitch 105 turned on, MS1-2 and MS1-3 contacts to be opened with the microswitch 105 turned on, and MS2-1 a contact to be closed with the microswitch MS turned on. The mechanical structure is the same as in FIG. 1.

With such arrangement as described above, now assume that the magnetic card 110 or some other object is being inserted into the card reader body, as shown in FIG. 1. If the normal material to be detected 27 is not contained in any magnetic card 110 or bonded thereon, or arranged properly in position, or if any foreign object other than the magnetic card 110 is attempted to use, the proximity switch 102 (detector S in FIG. 5) will not work. Thus the relay RL 1 is not operated, and the solenoid plunger 103 (MG in FIG. 5), which is a circuit element governed by this relay, is not operated either. The shutter 104 remains locked with the head 120 on the plunger 103 and prevents such a card or foreign object from being farther pushed into the body.

When any authentic magnetic card 110 is being inserted, the proximity switch 102 (detector S) may detect the presence of the normal material 27 and operate the relay RL1 so as to close the contact 1-1. Thus the relay RL2 is operated to close the contacts 2-1, 2-2, 2-3, 2-4 and 2-5. With the contact 2-2 closed, the solenoid plunger 103 (MG in FIG. 5) is actuated so as to pull the head 120 downward against the compression force of the coil spring 11. The shutter 104 is unlocked and the magnetic card 110 is now allowed to move on, pushing the shutter 104 upward with the leading edge thereof.

If the magnetic card 110 is taken out right after detection of the normal material 27 therein by the proximity switch 102 (detector S), the contact 1-1 is one closed with the relay RL1 operated then but is opened again in a moment. Meantime, with the contact 1-1 closed the relay RL2 is operated to close the contact 2-3 and then start operation of the timer T1, and at the same time close the contact 2-4 and start operation of the timer T2. As described above, operating time t2 of the timer T2 is set longer than that t1 of the timer T1 (for example, T1 is one second and T2 is ten seconds). Thus the timer T1 will stop operation earlier than the timer T2, and the realy RL3 starts operation. With the relay RL3 operated the contact 3-1 is opened so as to stop operation of the relay RL2. As a result, the contact 2-2 is opened, and the plunger 103 (MG) going to operate is made incapable to move. The shutter 104 can remain locked without interruption in this manner. At this time the contact 2-4 is opened, and the relay RL4 and the buzzer BZ connected in series with the timer T2 are made inoperative. In this case, operation of the alarming means BZ is not required as the cause of trouble is eliminated right away.

Now assume that the magnetic card 110 is not removed, and the shutter 104 is not attempted to open. Then, the relay RL1 may continue to operate. The timer T1, which started operation with the contact 2-3 on the relay RL2 closed will stop operation after a period of $t1$, when the relay RL3 is operated to open the contact 3-1. The relay RL2 may still be kept operative with the contact 1-1 remaining closed. On the other hand, the timer T2, which started operation with the contact 2-4 closed, will stop after a period of $t2$ as the same contact 2-4 is not opened. The relay RL4 is operated and at the same time the alarming means BZ is operated. With the relay RL4 operated the contact 4-1 is opened to stop operation of the plunger 103 (MG) and the shutter 104 is locked therewith. Meanwhile, with the contact 4-2 closed the relay RL4 is self held, and the alarming means BZ continues to work. The operation of the alarming means BZ is released by pressing a manual switch provided in a concentrated control room, for instance, after removing the magnetic card 110 causing the operation by a watchman who noticed such trouble. The magnetic card 110 is removed, and the relays RL1 and RL2 are not operated. When the relay RL4 stops operation, the contact 4-1 is closed, but the plunger 103 (MG) is kept inoperative. Then, when the magnetic card 110 is inserted into the body, pushing the shutter 104 upward or when it is used normally, the leading edge of the magnetic card 110 pushes the shutter 104, and the microswitch 105 (MS1) is actuated by swinging the actuator 118 mounted thereon with the arm 119 of the shutter 104. At this time the relay RL1 stops operation so as to open the contact 1-1 in a very short time, before the microswitch 105 (MS1) starts operation, while the normal material 127 in the magnetic card 110, which area is extremely small, may move away from over the proximity switch. On the other hand, the relay RL2 is operated when the contact 1-1 is closed, and the contacts 2-1 and 2-3 are closed, while the contact 3-1 remains closed too due to delayed operation of the relay RL3 by means of the timer T1. Thus the relay RL2 is self held for a while with the contact 2-1 closed and the contact 3-1 normally closed on the relay RL3. Meanwhile the microswitch 105 (MS1) is turned on so as to close the contact MS1-1, and thus the relay RL2 is continuously operated. With the microswitch 105 (MS1) turned on, the contact MS1-4 is closed to operate the motor M, and the magnetic card 110 is fed into the body through rollers (not shown). At this time the contacts MS1-2 and MS1-3 are broken so as not to operate the timers T1 and T2 and the relays RL 3 and RL 4. A code on the magnetic card 110 is read through a code reader (not shown here) in the body so that any desired operation may be accomplished such as opening the door of a safe or of a laboratory and the like, or carrying out cash, ticket and the like.

The magnetic card 110 may be returned in two ways after it was used: it may be carried out from other slot after passing through the body or it may be carried back from the slot by reversing the movement in the body. In the former case, when the magnetic card 110 has passed through the shutter 104, the microswitch 105 (MS1) is turned off, and the timer T1 is operated. Then the relay RL 3 is operated to open the contact 3-1, and the relay RL 2 stops operation, as it cannot be self held, to open the contact 2-3, The relay RL 3 stops operation, too. Thus all operation is suspended for restoration of the initial condition of the device. In this manner may not be required contact 2-3 on relay RL 2, microswitch MS 2 for reversing operation of the motor M, relay RL 5 and contacts 5-1 and 5-2, and reversing circuit 530, as readily understood.

In the latter case, when the magnetic card 110 turns on the microswitch MS2 for reversing motor operation provided in inner position in the body (not shown in FIG. 1), the relay Rl 5 is operated to close the contacts 5-1 and 5-2, and is self held. At the same time the motor M starts reverse driving through the reversing circuit 530. If the microswitch MS2 is so arranged as to be turned on with the leading edge of the magnetic card 110 before it passes out under the shutter 104, the microswitch 105 (MS1) may be kept in its on-state. When the magnetic card 110 is fed back, it is imparted some frictional force by the shutter (strictly speaking by the actuator 118 producing some resilience), and may stop as it is caught by the shutter 104. This magnetic card 110 is taken out by hand, when the microswitch 105 (MS1) is turned off, and the timer T1 is kept in operation for a little time before the normal material 27 to be detected passes away from over the proximity switch 102 (detector S). During this time the contact 2-1 on the relay RL 2 is closed to hold itself. Thus, such complicated operation as stopping operation once and starting it again with the contact 1-1 closed when the normal material 27 passes over the proximity switch 102 (detector S) is not required. On the other hand, the contact 1-1 is closed, but no operation is restarted. The device may stop all operation when the magnetic card 110 is completely taken out. In case the normal material 127 stays over the proximity switch 1-2 (detector S) for a long time even with the magnetic card 110 drawn out, the timer T2 may work so as to operate the alarming means BZ after a period of time t2 for sending alarm, as already described.

As has been described, in accordance with this invention the device can protect the card reader equipment against all possible forced insertion or use of any wrong card or foreign object therein with the shutter closed whenever such a thing is attempted to use intentionally or accidentally. This is a great advantage in view of protection of the card reader body. Furthermore, confidence may be secured satisfactorily by attaching any key code recorded invisibly in the magnetic card or containing the metal foil to be detected hidden therein. Still furthermore, a dust proof effect is given to the card reader of this type, which may be installed indoors or outdoors relatively often, with operating means, that is, the shutter in this invention to prevent dust from coming into the inner mechanism. This is of vital importance to the card reader.

As in the second and third embodiments, any person attempting to use a card not prepared normally or a foreign object may be found immediately by alarming means. This means that any person trying to insert his card not right for use innocently can be aware of his misuse and stop insertion at once. When any foreign object is being inserted maliciously, a watchman may be alarmed and run to see the device. In this manner the device can be protected from all possible damage or theft.

Furthermore, as in the third embodiment, operating means such as the shutter 104 and the like may be kept open for a while by self holding the relay RL 2 and with some time delay be means of the timer T1, until the microswitch 105 (MS1) is turned on after detection of the normal material 27 to be detected. Thus the area occupied by the material 127 can be extremely narrowed without requiring reduction of the recording region of a key code, and errors in reading such a code in the card reader body can be prevented from occurrence.

Also as in the third embodiment, the shutter 104 may be closed again by means of the timers T1 and T2, and relays RL 3 and RL 4 in case of no insertion of the magnetic card into the body in a certain period of time after detection of the normal material 127. Thus, even when the shutter is opened by use of a normal magnetic card for forced insertion of a wrong card or foreign matter, it cannot be attained.

For detecting the authenticity of a magnetic card may be considered some other methods than that by use of the proximity switch in the above embodiments, for example, detection by means of a magnetic sensor such as a Hall element for detecting ferromagnetic foil contained in the card or a magnetic layer itself in the foregoing magnetic card, and detection by throwing light such as infra-red rays upon a light emitting element or by cutting off the light. In the above embodiments, the proximity switch and the metal foil are employed as detecting means and a material to be detected respectively with the detector cover 112 made of nonmetal such as plastic. If a Hall element or magnetic sensor head is used as a detector, soft magnetic piece may be used as a material to be detected. In this case the detector cover 112 may be made of plastic, too. For optical detection may be employed a source of infra-red rays and lead sulfide PbS as its receptor in combination with a card having a hole or part extremely thin or part made thinner and filled with a material transparent to infra-red rays alone such as silicone.

We claim:

1. A protecting device for a card reader equipment in which key codes written on a card and the like are read including detecting means for detecting a normal material contained in said card, a shutter provided in a passage of said card, a first relay adapted to close its normally opened contact in response to any output signal from said detecting means, a second relay adapted to close its normally opened contacts in accordance with closing of the normally opened contact on said first relay, a plunger operated in accordance with closing of the normally opened contacts on said second relay for making said shutter open, said plunger leaving said shutter close when not operated, and a switch adapted to close its opened contact in accordance with movement of said shutter for holding said second relay in operation until said card passes through at least said shutter after output from said detecting means has disappeared.

2. A protecting device for a card reader equipment according to claim 1 further comprising a second switch for closing its normally opened contact when said shutter is pressed with said card, a normally closed contact connected in series with the normally opened contact on said second switch to be opened in accordance with the actuation of said second switch, and alarming means connected in series with the normally opened contact on said second switch and said normally closed contact for sending alarm when the normally opened contact on said second switch is closed and said normally closed contact is kept close due to non-operation of said second relay.

3. A protecting device for card reader equipment in which information on a recording medium such as a card and the like is read, comprising:

an aperture portion provided in a passage of the recording medium and adapted to lead said recording medium to said card reader equipment;

detecting means for detecting a normal material in said recording medium and developing an electrical output signal responsive to the detection thereof, said detecting means being disposed in the passage of the recording medium before said aperture portion with respect to a forward transporting direction of said recording medium;

shutter means for inhibiting the recording medium from passing through said aperture portion when no output signal is developed by said detecting means, said shutter means being disposed in the passage of the recording medium after said aperture portion with respect to the forward transporting direction of said recording medium;

control means for controlling said shutter means to permit said recording medium to pass through said aperture portion when said detecting means detects the normal material in said recording medium, and to inhibit said recording medium from passing through said aperture portion when said detecting means does not detect the normal material in said recording medium; and holding means for developing a hold signal to be applied to said control means to hold such a state that said control means permits said recording medium to pass through said aperture portion as long as said recording medium is placed upon said shutter means.

4. A protecting device for card reader equipment according to claim 3 wherein said shutter means comprises:

a movable member adapted to be placed in the passage of said recording medium to inhibit said recording medium from being inserted in said aperture portion when said detecting means does not detect the normal material in said recording medium, and to be removed from the passage of said recording medium to allow said recording medium to be inserted in said aperture portion when said detecting means detects the normal material in said recording medium, and supporting means for supporting said movable member in the passage of said recording medium when said detecting means does not detect the normal material in said recording medium.

5. A protecting device for card reader equipment according to claim 4 wherein said holding means comprises:

position detecting means for detecting whether said movable member is placed in the passage of said recording medium.

6. A protecting device for card reader equipment in which information on a recording medium such as a card and the like is read, comprising:

detecting means for detecting a normal material in said recording medium and developing an electrical output signal responsive to the detection thereof;

shutter means provided in a passage of the recording medium for inhibiting the recording medium from passing therethrough when no output signal is developed by said detecting means;

control means for controlling said shutter means to permit said recording medium to pass through a station, in which said shutter means is provided, when said detecting means detects the normal material in said recording medium, and to inhibit said recording medium from passing through said station in the passage of the recording medium when said detecting means does not detect the normal material in said recording medium;

holding means for developing a hold signal to be applied to said control means to hold such a state that said control means permits said recording medium to pass through said station in the passage of the recording medium as long as said recording medium is placed upon said shutter means; and temporary holding means for holding the output signal from said detecting means for a predetermined time at least until said holding means develops its output signal.

7. A protecting device for card reader equipment according to claim 6 wherein said shutter means comprises:

a movable member adapted to be placed in the passage of said recording medium to inhibit said recording medium from passing through said station in the passage of the recording medium when said detecting means does not detect the normal material in said recording medium, and to be removed from the passage of said recording medium to allow said recording medium to pass through the station in the passage of the recording medium when said detecting means detects the normal material in said recording medium, and supporting means for supporting said movable member in the passage of said recording medium when said detecting means does not detect the normal material in said recording medium.

8. A protecting device for card reader equipment according to claim 6 wherein said holding means comprises:

position detecting means for detecting whether said movable member is placed in the passage of said recording medium.

9. A protecting device for card reader equipment according to claim 6 further comprising:

an aperture portion adapted to lead said recording medium to said card reader equipment, said aperture portion being disposed after said detecting means and before said shutter means with respect to the forward transporting direction of said recording medium.

10. A protecting device for card reader equipment in which information on a recording medium such as a card and the like is read, comprising:

detecting means for detecting a normal material in said recording medium and developing an electrical output signal responsive to the detection thereof;

shutter means provided in a passage of the recording medium for inhibiting the recording medium from passing therethrough when no output signal is developed by said detecting means;

first control means for controlling said shutter means to permit said recording medium to pass through a station, in which said shutter means is provided, when said detecting means detects the normal material in said recording medium, and to inhibit said recording medium from passing through said station in the passage of the recording medium when said detecting means does not detect the normal material in said recording medium;

holding means for developing a hold signal to be applied to said control means to hold such a state that said control means permits said recording medium to pass through said station in the passage of the recording medium as long as said recording medium is placed upon said shutter means;

means for delaying the output signal from said detecting means by a predetermined time;

means for disenabling said delay means to operate responsive to an output signal from said holding means; and second control means for controlling said shutter means to inhibit said recording medium from passing through said station in the passage of the recording medium responsive to an output signal from said delay means.

11. A protecting device for card reader equipment according to claim 10 further comprising:

an alarm means responsive to an output signal from said delay means for developing an alarm signal.

12. A protecting device for card reader equipment in which information on a recording medium such as a card and the like is read, comprising:

detecting means for detecting a normal material in said recording medium and developing an electrical output signal responsive to the detection thereof;

shutter means provided in a passage of the recording medium for inhibiting the recording medium from passing therethrough when no output signal is developed by said detecting means;

control means for controlling said shutter means to permit said recording medium to pass through a station, in which said shutter means is provided, when said detecting means detects the normal material in said recording medium, and to inhibit said recording medium from passing through said station in the passage of the recording medium when said detecting means does not detect the normal material in said recording medium;

holding means for developing a hold signal to be applied to said control means to hold such a state that said control means permits said recording medium to pass through said station in the passage of the recording medium as long as said recording medium is placed upon said shutter means;

first sensing means for sensing that said shutter means is pressed by the recording medium in the passage;

second sensing means for sensing that said first sensing means is developing its sensing output while said detecting means is not developing an output signal; and alarm means responsive to the sensing output of said second sensing means for developing an alarm signal representing that the normal material is not present in said recording medium.

13. A protecting device for card reader equipment in which information on a recording medium such as a card and the like is read, comprising:

detecting means for detecting a normal material in said recording medium and developing an electrical output signal responsive to the detection thereof;

shutter means provided in a passage of the recording medium for inhibiting the recording medium from passing therethrough when no output signal is developed by said detecting means;

first control means for controlling said shutter means to permit said recording medium to pass through a station, in which said shutter means is provided, when said detecting means detects the normal material in said recording medium, and to inhibit said recording medium from passing through said station in the passage of the recording medium when said detecting means does not detect the normal material in said recording medium;

holding means for developing a hold signal to be applied to said control means to hold such a state that said control means permits said recording medium to pass through said station in the passage of the recording medium as long as said recording medium is placed upon said shutter means;

temporary holding means for holding the output signal from said detecting means a predetermined time at least until said holding means develops its output;

means for delaying the output signal a predetermined time longer than the predetermined holding time of said temporary holding means;

means for disenabling said delay means to operate responsive to an output signal from said holding means; and second control means for controlling said shutter means to inhibit said recording medium from passing through said station in the passage of the recording medium responsive to an output signal from said delay means.

14. A protecting device for card reader equipment according to claim 13 wherein said shutter means comprises:

a movable member adapted to be placed in the passage of said recording medium to inhibit said recording medium from being inserted in said aperture portion when said detecting means does not detect the normal material in said recording medium, and to be removed from the passage of said recording medium to allow said recording medium to be inserted in said aperture portion when said detecting means detects the normal material in said recording medium, and supporting means for supporting said movable member in the passage of said recording medium when said detecting means does not detect the normal material in said recording medium.

15. A protecting device for card reader equipment according to claim 13 wherein said holding means comprises:

position detecting means for detecting whether said movable member is placed in the passage of said recording medium.

16. A protecting device for card reader equipment according to claim 13 further comprising:

an aperture portion adapted to lead said recording medium to said card reader equipment, said aperture portion being disposed after said detecting means and before said shutter means with respect to the forward transporting direction of said recording medium.

* * * * *

UNITED STATES PATENT OFFICE
CERTIFICATE OF CORRECTION

Patent No. 3,946,204            Dated     March 23, 1976

Inventor(s)   TADASU TANIGUCHI, et al.

It is certified that error appears in the above-identified patent and that said Letters Patent are hereby corrected as shown below:

Column 2, line 4, change "another" to -- further --.
Column 4, line 12, after "out" insert -- of --; line 55, change "the" (second occurrence) to -- to --.
Column 5, line 16, change "foregin" to -- foreign --; line 28, change "use" to -- be used --; line 34, after "necessarily" insert -- be --; line 40, change "use" to -- be used --; line 45, after "whenever" insert -- it is attempted to use --; line 46, delete "is tried to use).
Column 8, line 12, change "is" to -- it --; line 13, delete "In".
Column 9, line 20, change "realy" to -- relay --.
Column 10, line 28, change "2-3," to -- 2-3. --; line 38, change "Rl 5" to -- RL 5 --.
Column 11, line 18, after "person" insert -- innocently --; line 19, delete "innocently"; line 28, change "be" to -- by --.
Column 12, line 11, change "close" to -- closed --; line 28, change "close" to -- closed --.

Signed and Sealed this

Thirty-first Day of August 1976

[SEAL]

Attest:

RUTH C. MASON
Attesting Officer

C. MARSHALL DANN
Commissioner of Patents and Trademarks